Aug. 6, 1940.  W. M. HAHNEMANN ET AL  2,210,664
RADIO DIRECTION FINDING SYSTEM
Filed Feb. 15, 1939
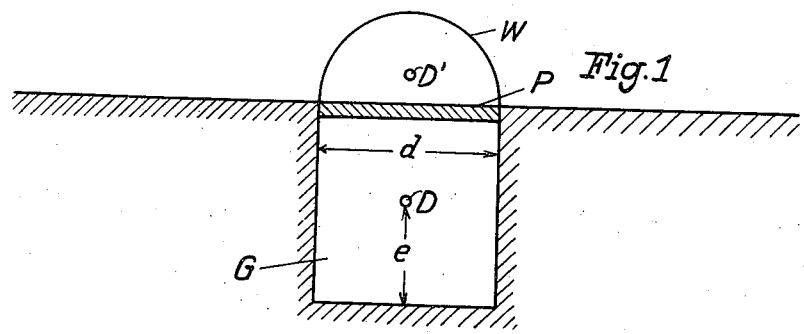
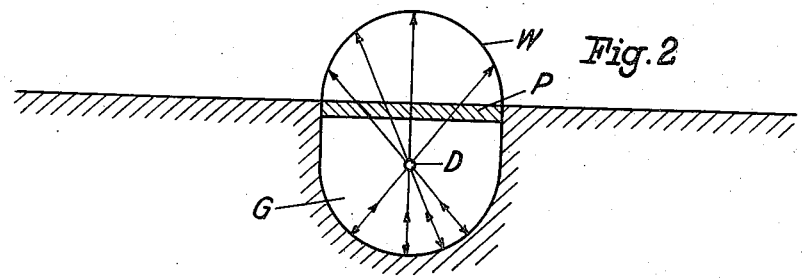
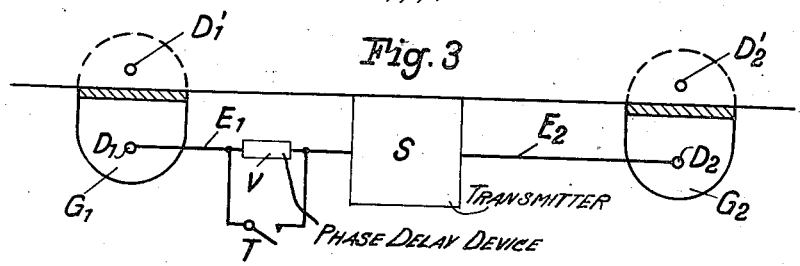
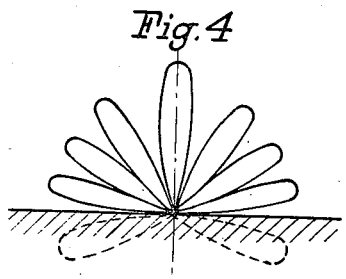
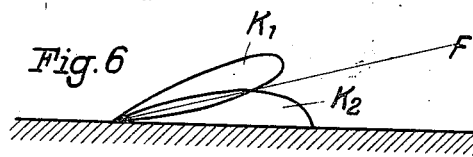
Inventors:
Walter Max Hahnemann
Ernst Kramar
by E.W. Chinney
Attorney

UNITED STATES PATENT OFFICE 2,210,664

RADIO DIRECTION FINDING SYSTEM

Walter Max Hahnemann and Ernst Kramar, Berlin, Germany, assignors to C. Lorenz Aktiengesellschaft, Berlin-Tempelhof, Germany, a company Application February 15, 1939, Serial No. 256,428
In Germany February 16, 1938

3 Claims. (Cl. 250—11)

The present invention relates to radio direction finding systems, and more particularly to radio beacons for producing glide path surfaces for landing airplanes, for example.

Radio transmitter systems for obtaining glide path surfaces are known which radiate electromagnetic waves to produce a torus-shaped diagram at a given angle of inclination to the earth's surface thus producing a surface of equal electromagnetic field intensity on which an aeroplane may descend. Radio transmitters or radio beacons of this type must satisfy the requirements that, on the first hand, the steepness of the surface of constant field intensity emitted for guiding aircraft to an airport is useful for the modern standard type of airplanes and, on the other hand, that the point of intersection between the landing glide path and the ground surface, that is, the point where the landing airplane first touches the ground, is positioned as central as possible with respect to the area of the airport so as to provide a sufficient space free of obstacles for the airplane to move on the ground until it becomes stopped. The heretofore known so-called slip-way beacons have been so dimensioned for the purpose of satisfying the above mentioned requirements that the actual landing point, that is, the point where the landing airplane first touches the ground, was so widely spaced apart from the slip-way beacon transmitter that every possibility for collision between the aeroplane rolling on the ground and an obstacle thereon was reliably eliminated. However, landing glide path curves dimensioned from the above mentioned point of view are too flat and do not correspond to the shape which is suitable for the customary type of aircraft. On the other hand, adequate glide paths are obtainable by means of constant field intensity surfaces when the point of intersection between these surfaces and the earth's surface coincide in the antenna array of the slip-way beacon. In order to provide possibilities to use the last mentioned glide path without running the risk of collisions between a landing airplane and eventual obstacles it has been suggested not to place the antennae at the boundaries of the landing plane or airport but to locate these means in a cavity of the earth's surface centrally with respect to the air port and to cover such cavity with a top layer of sufficient strength to carry an aeroplane rolling thereover.

Similar systems have been used in connection with another known arrangement for obtaining course lines or glide paths according to which in contradiction to a single surface of constant field intensity of a torus-shaped radiation diagram, two alternately emitted and mutually intersecting torus-shaped diagrams are employed, the field intensities of which are ascertained by comparison, so that the airplane may descend along a surface of equal field intensity set up by the alternately effective radiation diagrams.

Investigations have shown that particularly suitable radiation conditions are obtained in connection with transmitter systems being submerged in an excavation or excavations of the earth's surface in the central portion of the landing plane when the antenna structure which by way of example may be a simple horizontal doublet is placed in a cavity in the earth's surface, the inner diameter of which is small as compared with the operating wavelength of the system under consideration.

Our present invention makes reference to radio transmitter systems operating under the last mentioned conditions and has for its object to attain a possibly high radiation efficiency.

This is accomplished according to the main feature of our invention by imparting such a shape to the earth cavity in which the radio transmitter radiator or radiators are located, by so selecting the material or materials of the bottom, the walls and the cover of said cavity and by so spacing the radiator from the walls thereof that an optimum of radiation action is obtained. In other words, the walls and the bottom of the cavity are made of such material and the distance of the radiating means relative to the walls and the bottom of the cavity are so chosen that the radiation originated by the radiating means and being reflected at the bottom and the walls thereof contribute to the upwardly directed radiation in a strengthening sense.

The invention will be more fully understood from the following description taken in conjunction with the accompanying drawing, in which Fig. 1 shows one embodiment of the invention, Fig. 2 shows a modification of the embodiment of Fig. 1, Fig. 3 schematically illustrates a transmitter arrangement according to the invention, Fig. 4 and Fig. 5 show two different radiation diagrams produced according to the invention, while Fig. 6 shows a partial combination of the diagrams of Fig. 4 and Fig. 5. With reference to Fig. 1 there is shown a cavity G of rectangular cross sectional area and having a diameter $d$ which is small in comparison with the operating wavelength. A horizontal doublet or dipole D acts as radiator and is positioned in a distance $e$ above the bottom of the cavity. The upper portion of this cavity is closed by a plate P. Such transmitter arrangement produces a globe-shaped wave at the upper part of the cavity or, by employing a horizontal dipole a cylindrical wave is produced, the wave front of which is designated W. With reference to the Huyghens principle each part of this wave front forms a new source of radiation energy into all directions. This fact may be so interpreted as if a virtual radiation centre would exist above the earth's surface at the point D'. In other words, the transmitter arrangement acts as if there were a dipole D' above the earth's surface and as if no dipole D existed within the cavity.

In order to secure strong reflections at the walls of the cavity, these walls are made of a non-conducting or insulating material having a high dielectric constant, while the closing plate of the cavity consists of an insulating material of low dielectric constant so as to permit the radiation to unaffectedly penetrate this cover without being reflected. On the other hand, it is also possible to employ metallic coatings for the wall and for the bottom of the cavity. Wood of a low dielectric constant, preferably dried and paraffine impregnated or tarred wood are suitable materials for the plate P. This plate is upwardly arcuated so as to permit rain water to flow off since residual humidity would detrimentally affect the dielectric properties of this plate.

The shape of the cavity is chosen from the point of view that the bottom and the walls thereof should optimally contribute the upwardly directed radiation emitted by the dipole heretofore mentioned so as to secure a globe-shaped or cylindrical wave of greatest possible strength at the upper rim of the cavity. The radiator D is therefore so spaced from the bottom and the wall that the radiation reflected therefrom is in phase coincidence with the directly and upwardly radiated wave so as to secure an additive effect of the combined direct and indirect radiation. In cases where reflection is controlled by a more dense medium, that is metallic reflection, which is effected in phase opposition, the distance $e$ between the dipole D and the bottom of the cavity is equal to a quarter of an operating wavelength or an uneven multiple of a quarter of a wavelength, while by controlling reflection with a medium of low density, that is dielectric reflection, the distance $e$ between the dipole D and the bottom of the cavity is an integral multiple of half an operating wavelength. In practical operation there will be a mean value between the metallic and the dielectric reflection on account of the conductivity of the soil. Under certain operating conditions, a mean distance $e$ between the above mentioned distances must be empirically determined. In order to improve still further reflection at the bottom of the cavity for obtaining a strong cylindrical wave at the upper end of the cavity, the cross sectional area of the cavity is made semi-circular according to a further feature of the invention. This embodiment is shown in Fig. 2 and the radiator D is positioned in the central point of an assumed circle passing through the semi-circular boundary of the bottom. The wave emitted is consequently uniformly strengthened into all directions by this measure as shown by the arrows in Fig. 2. Attention must be called to the fact that the reflection at a semi-spherical surface is contradictory to the parabolic reflection according to which the entire number of reflected rays are parallel to one another so that no cylindrical wave can be produced.

The radio transmitter arrangement having its radiators submerged in a cavity in the earth's surface may suitably be combined with methods different from the heretofore mentioned methods of producing glide path surfaces. In other words, the airplane is not caused to descend on a surface of constant field intensity but to descend on a predetermined glide path surface produced by radiations of different field intensities which are caused to overlap each other. So produced glide path surfaces are preferably well adapted for landing airplanes. Radio direction finding systems operating according to this method employ in the receiving equipment a variable parallel resistance which serves for controlling the sensitivity of the receiver and/or the indicating instrument cooperatively connected with the receiver. This resistance is controlled by a clockwork being started in a predetermined distance from the landing airport. This known method has not yet been successfully realized in practical use since the point at which the airplane first touches the earth's surface was too close to the antenna system concerned. This disadvantage is eliminated due to the combination with a cavity in the earth's surface. A radio transmitter system provided in an excavation of the earth's surface may according to still a further feature of our invention also be applied to the second method of producing glide path surfaces heretofore mentioned, that is in connection with transmitter systems which produce mutually intersecting diagrams and according to which the aeroplane descends on the line of equal field intensity produced by said two diagrams. In order to realize this feature of the invention, two of the heretofore disclosed cavities are provided and spaced apart from one another at a distance equal to a plurality of operating wavelengths. Such a transmitter system is shown in Fig. 3. Two cavities $G_1$ and $G_2$ are provided and a horizontal dipole $D_1$ and $D_2$, respectively, is located in its appertaining cavity. These two dipoles are thus spaced apart at a plurality of operating wavelengths. Also in this case the assumed or virtual dipoles $D_1'$ and $D_2'$ are effective above the earth's surface. It may at first be assumed that the dipoles $D_1$ and $D_2$ are cophasally fed from the high frequency generator S common thereto. This is accomplished in the simplest manner by making the feeder lines $E_1$ and $E_2$ equal in length so that the transmitter S is positioned in a plane symmetrical with respect to the cavities $G_1$ and $G_2$. Due to the energization of the two dipoles in phase coincidence and due to the interference between the waves emitted by said two dipoles, a multi-leave or lobe radiation diagram as shown in Fig. 4 is obtained. This diagram presents sharply defined minima in a direction parallel to the earth's surface and a sharply defined maximum in the plane of symmetry between the two dipoles. It will now be assumed that the two dipoles $D_1$ and $D_2$ are energized in phase opposition, in which case the radiation diagram shown in Fig. 5 is obtained. This diagram likewise presents a plurality of leaves or lobes similar to the diagram of Fig. 4 but with the essential difference that the diagram according to Fig. 5 has its maxima in the same position where the diagram according to Fig. 4 has its minima of radiation. In other words, the radiation diagram of Fig. 5 has its maxima in a direction which coincides with the earth's surface while a minimum is set up in the plane of symmetry between the two dipoles. It is a matter of fact that the diagrams considerably vary in shape when used in connection with ultra short waves and this variation is due to the particular properties of propagation of these very high frequencies. This fact must accordingly be considered. In accordance with still a further feature of the invention the dipoles $D_1$ and $D_2$ are alternately energized in phase coincidence and in phase opposition so that the diagrams shown in the Figs. 4 and 5 overlap each other as more closely shown in Fig. 6. The point of intersection between each of the lowest lobes of the two different multi-lobe diagrams K1 and K2 of Fig. 6 produces a surface F of equal field intensity which then serves as glide path surface.

The phase displacement or rotation in the transmitter arrangement according to Fig. 3 is preferably secured by interposing in one of the feeder lines E1 or E2 of equal length a phase delay or timing device V, which may be a prolongation loop or a by-pass arrangement which may be alternately opened or short-circuited in a predetermined rhythm by the agency of a key T.

The transmitter arrangement according to the last mentioned embodiment is positioned approximately in the central portion of the airport since airplanes may roll over the cover applied on the top of the cavity or cavities.

What is claimed is:

1. A radio beacon transmitter system for obtaining glide path surfaces, comprising two radiating means each located in a cavity of the earth's surface spaced apart at a distance equal to a plurality of operating wavelengths, a high frequency transmitter, feeder lines coupling said high frequency transmitter to each of said radiating means, means to alternately energize said two radiating means in phase coincidence and phase opposition with one another for producing two mutually overlapping radiation diagrams, and means to strengthen said radiation by reflection comprising a bottom member and wall members in each of said cavities of such shape and composition and so spaced apart from said radiating means that the radiation therefrom being reflected by said members contributes to the said upwardly directed radiations.

2. The invention according to claim 1, characterized in that the said radiating means are coupled to said high frequency transmitter by feeder lines of equal length.

3. The invention according to claim 1, characterized in that a phase delay device is interposed in one of said feeder lines, means being provided to intermittently render said phase delay device effective and ineffective.

WALTER MAX HAHNEMANN.
ERNST KRAMAR.